No. 845,391. PATENTED FEB. 26, 1907.
J. BIJUR.
NEGATIVE POLE PLATE.
APPLICATION FILED APR. 5, 1906.
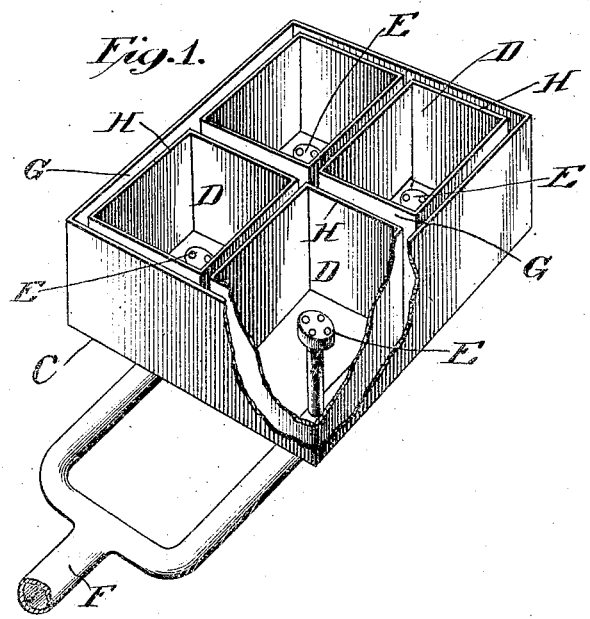
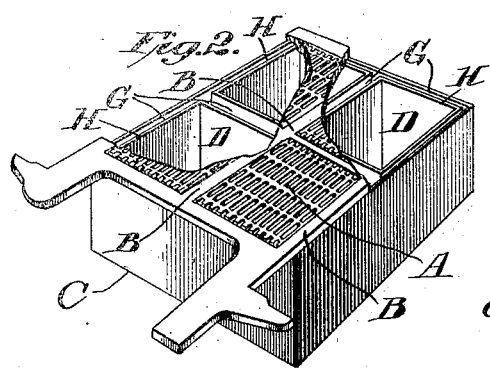
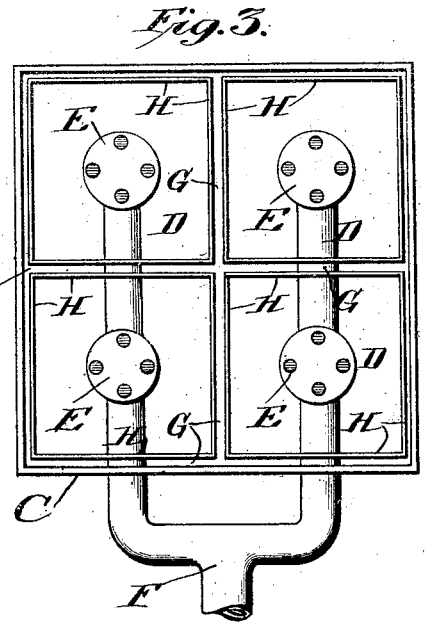
Attest:
Inventor:
Joseph Bijur
by Dickerson, Brown, Raegener & Binney
Attys

UNITED STATES PATENT OFFICE.

JOSEPH BIJUR, OF NEW YORK, N. Y., ASSIGNOR TO THE GENERAL STORAGE BATTERY COMPANY, A CORPORATION OF NEW YORK.

NEGATIVE-POLE PLATE.

No. 845,391.                 Specification of Letters Patent.            Patented Feb. 26, 1907.

Application filed April 5, 1906. Serial No. 309,986.

*To all whom it may concern:*

Be it known that I, JOSEPH BIJUR, a citizen of the United States, and a resident of the borough of Manhattan, city, county, and State of New York, have invented certain new and useful Improvements in Processes of Treating Negative-Pole Plates and Products, of which the following is a specification accompanied by drawings.

This invention relates to a process of treating negative-pole plates for storage batteries and the plate produced thereby.

The invention is applicable to both Planté plates and pasted plates; and the objects of the invention are to prevent the loss of capacity in the plate and coherence of the porous sponge into a metallic mass, insure permanent passage-ways for the diffusion of the electrolyte, and secure strong and hardy plates which will not become permanently sulfated and have all the above characteristics.

Further objects of the invention will hereinafter appear; and to these ends the invention consists of the process and resulting plate for carrying out the above objects embodying the steps and features hereinafter fully described and claimed in this specification and illustrated by suitable apparatus in the accompanying drawings, which show apparatus for carrying out a portion of the process for the modification of the plate.

In the drawings, Figure 1 is a perspective view, partly broken away, showing heating apparatus. Fig. 2 is a perspective view showing a plate on the heating apparatus, and Fig. 3 is a top plan view of the apparatus on an enlarged scale to show the details of construction.

According to this process the active material on the plate is impregnated with inert material of a suitable character for carrying out the objects of the invention. This material should be of a character which will not be chemically acted upon by the electrolyte—as, for instance, carbon. One of the leading characteristics of this invention resides in the fact that the plates are treated in accordance with this process after they have been formed or otherwise completed instead of having the inert material introduced into the mass of active material before the plate is finished.

In carrying out the process for a Planté plate the plate is first formed and reduced to a negative-pole plate in the usual manner and allowed to dry. It is then soaked for about ten minutes in a solution of sugar or other suitable substance, by means of which the pores of the plate become filled with the solution. I find that a solution penetrates the pores of the plate readily, and a solution of sugar has been found to operate satisfactorily and well. The sugar solution may be of about two per cent. to about thirty per cent. strength, although other percentages may be found suitable for carrying out the process. I have found that the process is successfully carried out when the solution is at ordinary room temperature. The plate is then removed from the solution, and it may be rinsed to rinse the sugar solution from the surface of the plate or else the rinsing may be omitted. The plate is then dried by permitting it to stand in air.

If the plate is all lead, it is baked in any suitable apparatus at a temperature of from about 240° centigrade to 300° centigrade until the sugar is substantially completely carbonized, which may take five or ten minutes. If the plate has antimonious alloy parts—as, for instance, an alloy frame melting at a lower temperature than the remainder of the plate—it is treated in such manner that the alloy parts are heated less than the lead parts, so as to insure that they are not partially fused in the treatment. In the drawings a frame of heating apparatus is shown for heating a plate having an alloy frame.

A represents the plate, and B the alloy frame. The apparatus comprises a framework C, preferably constructed of sheet-steel and provided with compartments D, under each of which there is a gas-burner E, connected to a supply-pipe F. Preferably the steel framework C is double in form and provided with the air-spaces G between the walls H of the framework, and the compartments D are of substantially the same size as the grills on the plate, so that when the plate is laid on top of the framework C, as in Fig. 2, the grills are arranged over the burners, and the framework B of the plate lies along the upper surfaces of the walls of the framework C and over the air-spaces G in said framework. In accordance with this construction the grills are subjected to a higher degree of heat than the frame of the plate. Any other suitable form of apparatus may be devised for carrying out the same objects, and the invention is not limited to the apparatus shown. After the plate has been baked or heated it may again be rinsed to remove any of the particles of sugar which were not converted into carbon in the heating process, and the plate is ready for use. It will be found that the pores of the plate have been impregnated with inert material in the form of carbon.

In carrying out the process after the plate is removed from the solution and allowed to dry the sugar solution in the pores deposits finely-divided organic material in the plate, which material is afterward carbonized in the step of heating. In accordance with this process the finely-divided organic material is deposited very evenly and uniformly in the pores of the plate, and it does not interfere with the natural coherence of the lead.

This invention enables inactive material to be introduced into the pores of Planté plates after they have been formed, and the process may be carried out with plates which have been in use.

My invention enables inert material to be introduced into the pores of the active mass of negative-pole Planté plates. The process may also be carried out with pasted plates, for the invention enables the inactive material to be introduced into the pores of the active mass of pasted plates even after they have been in use and have partially lost their capacity from the lack of such material, thereby again raising the capacity of the plate. In treating pasted plates after the plate is pasted and dried or after it has been reduced to a negative condition it is dipped in the sugar solution and allowed to remain for about ten minutes, as before. It is then removed and allowed to dry in the air and heated at the same temperature as for a Planté plate, thereby substantially carbonizing the organic material in the pores of the plate deposited out of the solution, so that a pasted plate is obtained having inactive material incorporated in the paste. This is a very easy way of obtaining a uniform distribution of a very slight percentage of inactive material and one which will not injuriously disintegrate the mass.

The invention also contemplates soaking a Planté or pasted plate in a solution of suitable material—as, for instance, sodium silicate—in which case the inactive material is deposited in the pores of the active mass in the plate chemically instead of by drying and carbonization.

The Planté plate after having been treated in accordance with this process has a light brownish-gray color instead of the usual lead-gray color of the Planté plate. The plate has a very porous and spongy appearance, as distinguished from the ordinary Planté plate which has not been treated in accordance with this process. In use the capacity of the plate either remains substantially the same or rises instead of falling off.

What I claim, and desire to secure by Letters Patent, is the following:

1. The process of treating plates adapted for use as negative-pole plates which consists in soaking the plate in a solution capable of penetrating the pores of the plate and there depositing an inert substance.

2. The process of treating plates adapted for use as negative-pole plates which consists in soaking the plate in a solution of an organic substance capable of penetrating the pores of the plate and there depositing an inert substance.

3. The process of treating plates adapted for use as negative-pole plates which consists in soaking the plate in a solution of sugar capable of penetrating the pores of the plate and there depositing an inert substance.

4. The process of treating plates adapted for use as negative-pole plates which consists in soaking the plate in a solution of an organic substance capable of penetrating the pores of the plate and there depositing an inert substance, then heating the plate to carbonize the substance deposited.

5. The process of treating plates adapted for use as negative-pole plates which consists in soaking the plate in a solution of sugar capable of penetrating the pores of the plate and there depositing an inert substance, then heating the plate to carbonize the substance deposited.

6. The process of treating plates adapted for use as negative-pole plates, which consists of incorporating an inert substance in the pores of the active mass by treating said plate with a fluid capable of entering the pores and depositing inert material.

7. A negative-pole Planté plate having inert material incorporated within the active material.

8. A negative-pole Planté plate having inert material incorporated within the active material, and characterized by a brownish-gray color before use and spongy appearance, an increased porosity of the active mass and a substantially sustained capacity in use.

9. A negative-pole Planté plate having inert material incorporated within the active material, and characterized by a brownish-gray color before use and a substantially sustained capacity in use.

10. A negative-pole Planté plate having inert material in the form of carbon incorporated within the pores of the active mass.

11. A negative-pole Planté plate characterized by having inert material incorporated in the active material and a substantially sustained capacity in use.

12. A negative-pole Planté plate having porous inert material incorporated within the active material.

In testimony whereof I have signed this specification in the presence of two subscribing witnesses.

JOSEPH BIJUR.

Witnesses:
 OLIN A. FOSTER,
 A. L. O'BRIEN.